(12) United States Patent
Wahle

(10) Patent No.: US 10,352,662 B2
(45) Date of Patent: Jul. 16, 2019

(54) UNMANNED AERIAL VEHICLE CAPTURE APPARATUS

(71) Applicant: Stephen Raymond Wahle, Vancouver, WA (US)

(72) Inventor: Stephen Raymond Wahle, Vancouver, WA (US)

(*) Notice: Subject to any disclaimer, the term of this patent is extended or adjusted under 35 U.S.C. 154(b) by 0 days.

(21) Appl. No.: 15/925,694

(22) Filed: Mar. 19, 2018

(65) Prior Publication Data

US 2018/0266793 A1  Sep. 20, 2018

Related U.S. Application Data

(60) Provisional application No. 62/473,983, filed on Mar. 20, 2017.

(51) Int. Cl.
| | |
|---|---|
| *F41B 3/02* | (2006.01) |
| *F41H 11/02* | (2006.01) |
| *F42B 6/00* | (2006.01) |
| *B64C 39/02* | (2006.01) |

(52) U.S. Cl.
CPC .............. *F41H 11/02* (2013.01); *F41B 3/02* (2013.01); *F42B 6/00* (2013.01); *B64C 39/024* (2013.01); *B64C 2201/182* (2013.01)

(58) Field of Classification Search
CPC ........................................................ F41B 3/02
See application file for complete search history.

(56) References Cited

U.S. PATENT DOCUMENTS

| | | | | |
|---|---|---|---|---|
| 2,823,483 A | * | 2/1958 | Malott | A01K 97/02 |
| | | | | 124/20.1 |
| 5,279,276 A | * | 1/1994 | Nagel | F41B 3/02 |
| | | | | 124/20.1 |
| 6,209,531 B1 | * | 4/2001 | Boon | F41B 3/02 |
| | | | | 124/20.1 |
| 6,286,495 B1 | * | 9/2001 | Brown | F41B 3/02 |
| | | | | 124/20.1 |

* cited by examiner

*Primary Examiner* — John A Ricci
(74) *Attorney, Agent, or Firm* — Rylander & Associates PC

(57) ABSTRACT

An unmanned aerial vehicle capture apparatus adaptable to a slingshot with a sling, including a launch handle with handle with a flat surface and attachment wings with apertures, a launch container having nodules fitting into wing apertures, such that sling of slingshot is sandwiched between launch container and launch handle, and an entanglement apparatus including a plurality of solid objects connected to a line.

3 Claims, 7 Drawing Sheets

UNMANNED AERIAL VEHICLE CAPTURE APPARATUS

CROSS-REFERENCE TO RELATED APPLICATION

This application is a nonprovisional claiming the benefit of, and priority to U.S. Provisional Patent Application Ser. No. 62/473,983 filed on 20 Mar. 2017, incorporated herein by reference.

TECHNICAL FIELD

This specification relates to unmanned aerial vehicles (UAVs). More particularly, the present specification relates to a nondestructive apparatus for capturing, while in flight, an unmanned aerial vehicle.

BACKGROUND

Unmanned aerial vehicles (UAVs), are devices that fly without an onboard human pilot. They may be remotely controlled or autonomous. They can be used for entertainment as well as commercial and military activities. Once primarily used in the military, technological advances have made UAVs smaller, lighter, and less expensive, allowing for a broad range of consumers and enthusiasts.

The increasing use of UAVs has coincided with a similarly increased misuse in the form of flying and trespassing over property. This has given rise to the need for capturing or destroying such UAVs. Typically, the means for capturing a UAV involves launching a form of net as a projectile from either another UAV or from a type of explosive firing device such as a bazooka or similar firing mechanism. Other methods have involved sending radio signals to interrupt the control mechanism of the target UAV.

These devices and methods are typically expensive and can frequently fail in their attempt to capture a UAV. What is needed is a reliable, nondestructive, and cost effective method for disabling and capturing intrusive UAVs.

SUMMARY

The invention is a handheld, manual, nondestructive, nonexplosive launching mechanism and entanglement apparatus that disables and captures a UAV by entangling with it's propellers preventing it from flying.

The launching mechanism is a handheld apparatus such as a slingshot that includes a launch handle and launch container that holds an entanglement apparatus. The launch container is attached to the launch handle so that it opens and releases the entanglement apparatus at the point the launching mechanism is fired, propelling the entanglement apparatus toward the UAV.

The UAV capture apparatus is lightweight and can be hand carried. It is compact and can be easily stored in a trunk or glove compartment of a typical vehicle.

BRIEF DESCRIPTION OF THE PICTURES

The accompanying pictures, which are incorporated into and constitute a part of this specification, illustrate one or more embodiments of the inventive subject matter and, together with the detailed description, serve to explain the principles and implementations thereof. Like reference numbers are used to designate identical, corresponding, or similar components in different figures.

FIG. 1 is a broad side view of the launch handle.
FIG. 2 is a broad side view of the launch container.
FIG. 3 is a narrow side view of the launch handle and the launch container.
FIG. 4 is a broad side view of the launch handle attached to the launch container with the sling of the slingshot held in between.
FIG. 5 is a top view of a slingshot, with sling sandwiched between launch handle and launch container.
FIG. 6 is a view of the entanglement apparatus.
FIG. 7 is a view of the entanglement apparatus and the launch container.
FIG. 8 is a view of the entanglement apparatus and the launch container and launch handle attached to the slingshot.
FIG. 9 is a view of the entanglement apparatus placed in the launch container.
FIG. 10 is a top down view of the slingshot, launch handle, and launch container with the entanglement apparatus inside the launch container.
FIG. 11 is a side view of the slingshot with launch handle, launch container and entanglement apparatus.

REFERENCE NUMBERS

| | |
|---|---|
| 2 | Launch handle |
| 4 | Handle portion of launch handle |
| 6 | Surface of launch handle |
| 8 | Perpendicular wing of launch handle |
| 10 | Wing aperture of launch handle |
| 12 | Launch container |
| 14 | Side of launch container |
| 16 | Nodule on side of launch container |
| 18 | Sling of slingshot |
| 20 | Elastic of slingshot |
| 22 | Y prong of slingshot |
| 24 | Entanglement apparatus |
| 26 | Entanglement apparatus line |
| 28 | Entanglement apparatus solid object |
| 30 | Arm bar of slingshot |

DETAILED DESCRIPTION

As shown in FIGS. 1-4, Launch handle 2 handle portion 4 attaches perpendicularly to the flat surface 6. Wings 8 with apertures 10 are perpendicular to the flat surface 6. Launch container 12 has nodules 16 on its sides 14. Launch handle 2 attached to launch container 12 with the sling 18 between. Elastic 20 is attached to the Y prong 22 of slingshot.

As shown in FIG. 5, in use hand holds slingshot with the sling 18 between launch handle 2 and launch container 12 and nodules 16 in the wing apertures.

FIG. 6 shows the entanglement apparatus 24 with the entanglement apparatus solid object 28 and the entanglement apparatus line 26.

Figure 1:
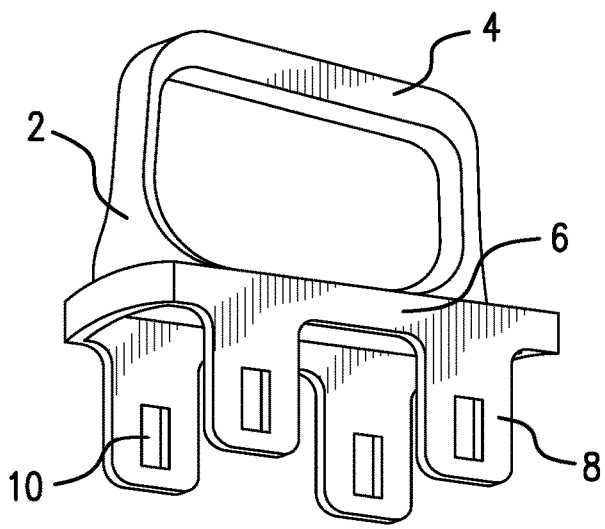
Figure 2:
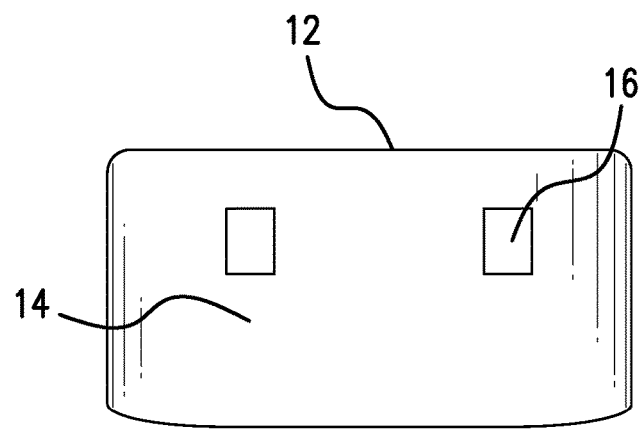
Figure 3:
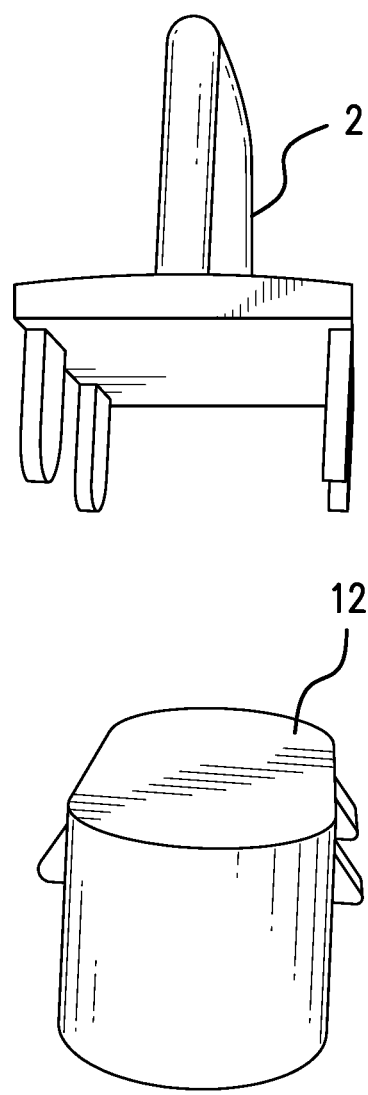
Figure 4:
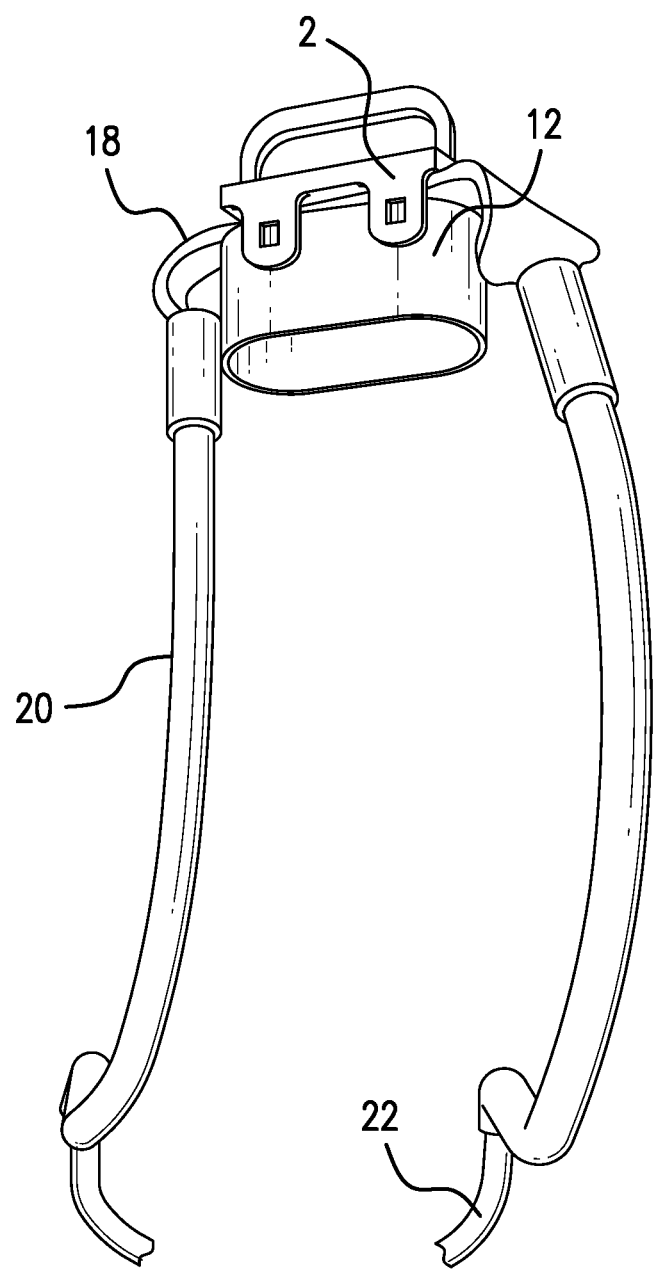
Figure 5:
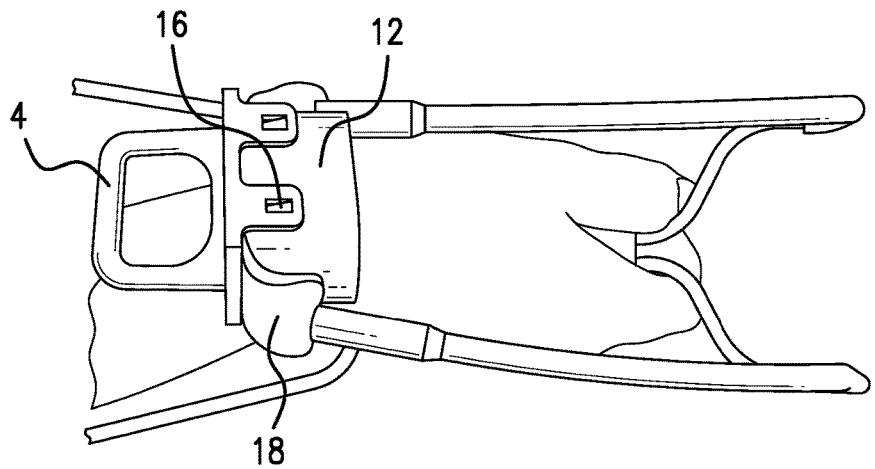
Figure 6:
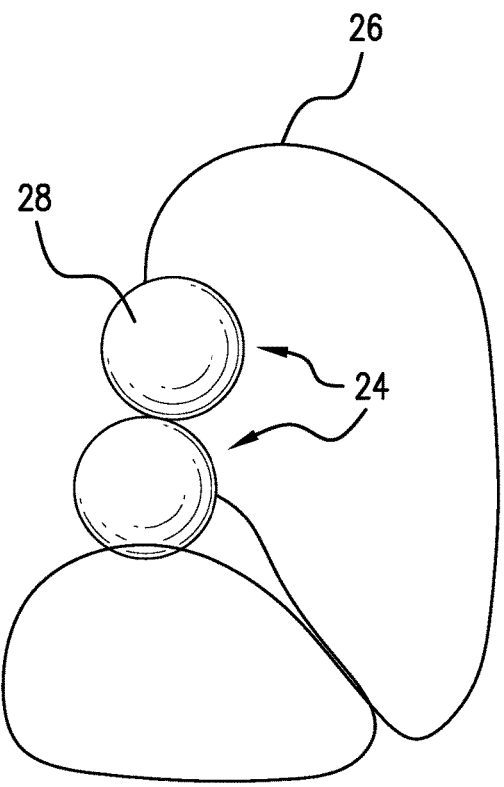
Figure 7:
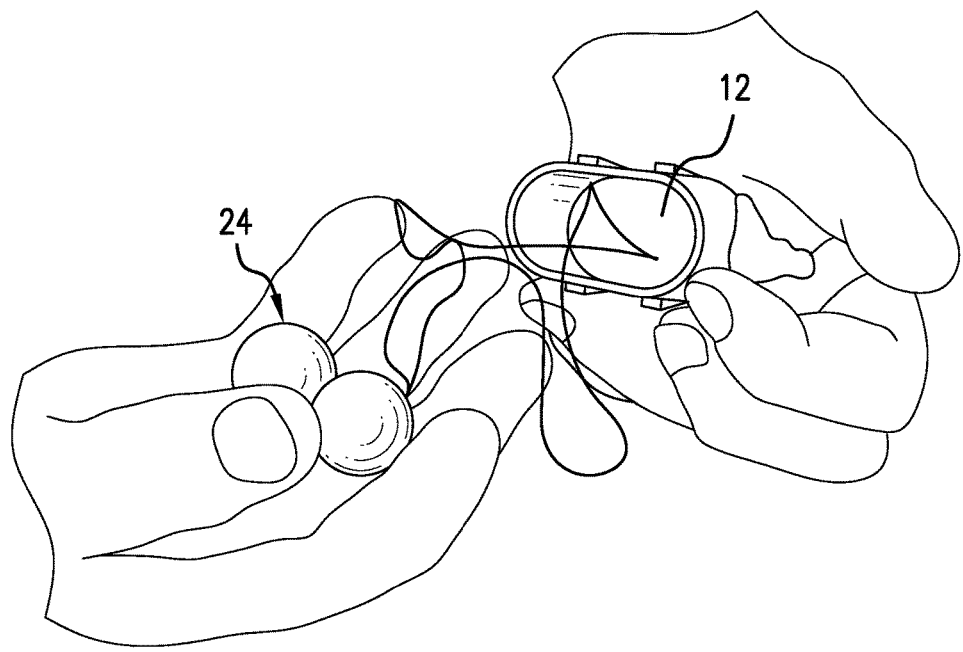
FIG. 7 shows entanglement apparatus 24 and the launch container 12.
Figure 8:
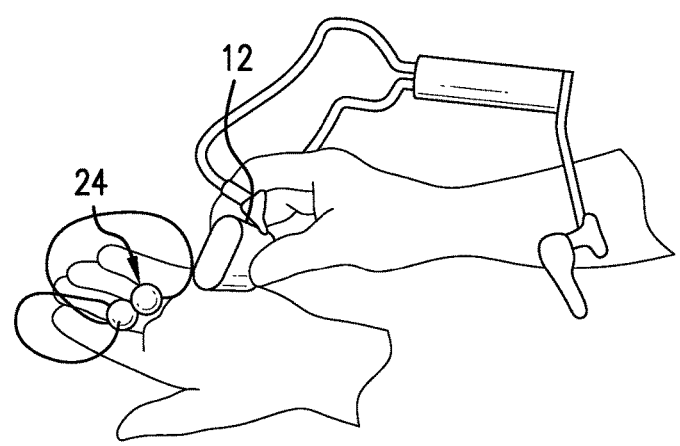
FIG. 8 shows entanglement apparatus 24 and the launch container 12 attached to the slingshot.
Figure 9:
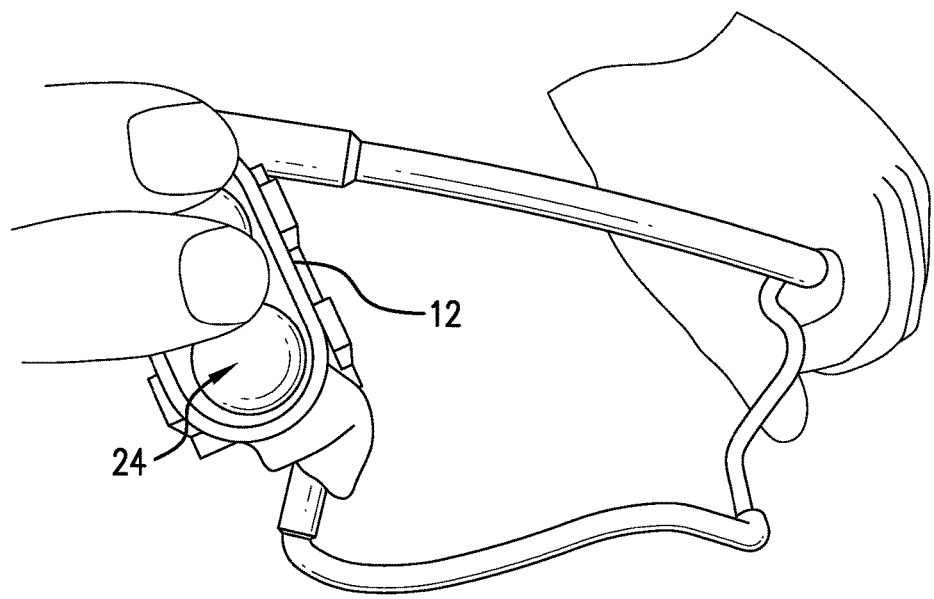
Figure 10:
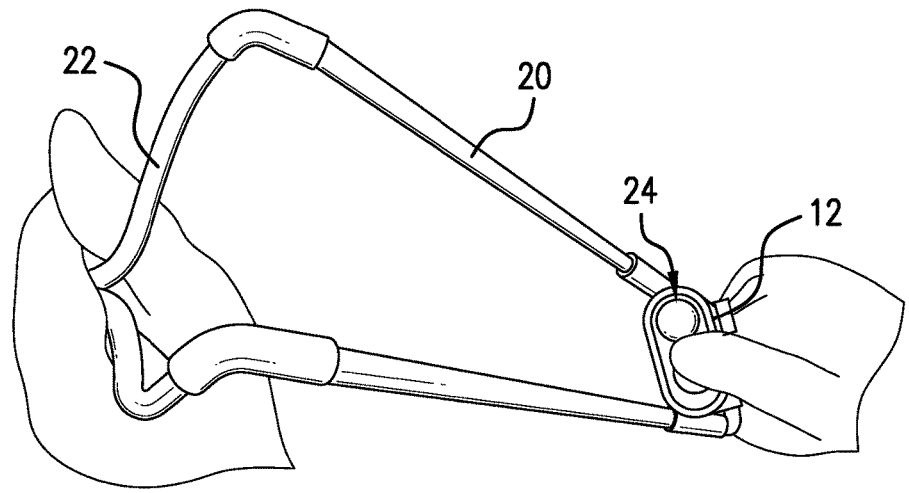

FIGS. 9, 10 show entanglement apparatus 24 placed in the launch container 12, with FIG. 10 showing slingshot elastic 20 extended in launch position, and the entanglement apparatus 24 in the launch container 12.

Figure 11:
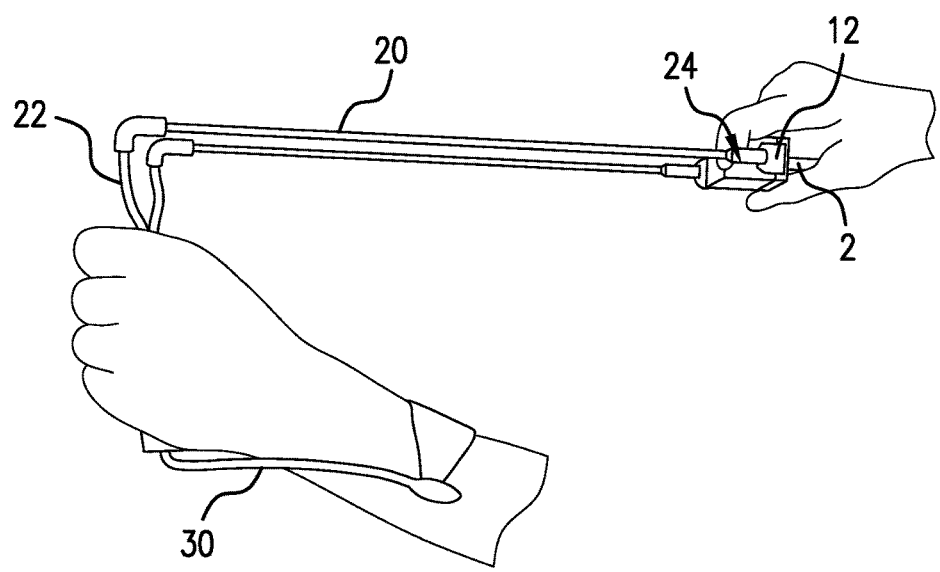

FIG. 11 is a side view of the slingshot in launch position with the Y prong 22 aimed, the arm bar 30 in secure position, the slingshot elastic 20 extended with the entanglement apparatus 24 loaded into the launch container 12 that is attached to the launch handle 2.

First Representative Embodiment

One embodiment of the UAV capture apparatus comprises a slingshot, a launch handle, a launch container, and an entanglement apparatus that fits into the launch container.

The slingshot is a Y-shaped implement with a loop of elastic fastened to the ends of the two prongs, with a cloth sling attached to the elastic that can be used to hold a payload. The lower end of the Y-shaped implement is attached to a firm loop called an arm bar that rests upon the forearm to provide a secure hold of the Y-shaped implement. The Y-shaped implement is between 6" and 12" in height and between 4" and 8" in the width between the two prongs.

The launch handle is made of hard plastic and is an open rectangular handle that a hand can grasp that is perpendicularly attached to a rectangular flat surface. The flat surface has four wings that are perpendicular and on the opposite side of the surface to the handle. Each of the four wings has a hole adapted to fitting a launch container nodule. The handle is between 2" and 4" in width and between 1" and 2" in height. The rectangular flat surface is between 2" and 4" in width and between 1" and 3" in height. The perpendicular wings are between ½" and 1" in length and between ½" and 1" in height. The launch handle is attached to the cloth sling of the slingshot.

The launch container is an elliptical tub. The semi minor axis diameter is between 1" and 3". The semi major access diameter is between 2" and 4". The depth of the container is between 1" and 3". The container is made of a hard plastic. The sides of the container have nodules that fit into the apertures of the wings of the launch handle.

The entanglement accessory is comprised of two spheres that are attached to opposite ends of a line. The spheres are between ½" and 2" in diameter and are made of hard plastic. The line is made of 80 pound test fishing line. The line is between 1' and 4' in length.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

What is claimed is:

1. An unmanned aerial vehicle capture apparatus adaptable to a slingshot with a sling, comprising:

A launch handle with handle with a flat surface and attachment wings with apertures;

A launch container having nodules fitting into wing apertures, such that sling of slingshot is sandwiched between launch container and launch handle; and A entanglement apparatus including a plurality of solid objects connected to a line.

2. The unmanned aerial capture apparatus of claim 1, wherein the entanglement apparatus solid objects are two spheres.

3. An unmanned aerial vehicle capture apparatus adaptable to a slingshot with a sling, comprising:

A launch handle with handle with a flat surface and attachment wings with apertures;

A launch container having nodules fitting into wing apertures, such that sling of slingshot is sandwiched between launch container and launch handle; and A entanglement apparatus including a plurality of solid spheres connected to a line.

\* \* \* \* \*